(12) United States Patent
Schmerling et al.

(10) Patent No.: US 11,120,404 B2
(45) Date of Patent: Sep. 14, 2021

(54) METHOD AND SYSTEM FOR DYNAMIC DATA COLLECTION WHILE OPTIMIZE A SMART DEVICE

(71) Applicant: Capital One Services, LLC, McLean, VA (US)

(72) Inventors: Daniel Schmerling, Owings Mills, MD (US); Amy Yost, Tampa, FL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/534,085

(22) Filed: Aug. 7, 2019

(65) Prior Publication Data

US 2021/0042706 A1 Feb. 11, 2021

(51) Int. Cl.
*G06Q 10/10* (2012.01)
*G06F 16/9035* (2019.01)
*G06F 16/901* (2019.01)
*G06F 11/34* (2006.01)

(52) U.S. Cl.
CPC ..... *G06Q 10/1053* (2013.01); *G06F 11/3438* (2013.01); *G06F 16/9017* (2019.01); *G06F 16/9035* (2019.01)

(58) Field of Classification Search
None
See application file for complete search history.

(56) References Cited

U.S. PATENT DOCUMENTS

| | | | |
|---|---|---|---|
| 5,884,270 A | 3/1999 | Walker et al. | |
| 6,385,620 B1 | 5/2002 | Kurzius et al. | |
| 6,618,734 B1 | 9/2003 | Williams et al. | |
| 7,424,438 B2 | 9/2008 | Vianello | |
| 7,490,086 B2 | 2/2009 | Joao | |
| 9,460,461 B1* | 10/2016 | Gill | G06Q 30/0641 |
| 9,665,641 B1 | 5/2017 | Zhang | |
| 2006/0143228 A1 | 6/2006 | Odio-Paez et al. | |
| 2007/0088801 A1* | 4/2007 | Levkovitz | H04L 67/20 709/217 |
| 2008/0162459 A1 | 7/2008 | Portnoy | |
| 2009/0063565 A1 | 3/2009 | Abhyanker | |
| 2009/0240647 A1* | 9/2009 | Green | G06N 7/005 706/52 |
| 2010/0153290 A1 | 6/2010 | Duggan | |

(Continued)

OTHER PUBLICATIONS

Seyed Amir Hoseini-Tabatabaei, Alexander Gluhak, and Rahim Tafazolli. 2013. A survey on smartphone-based systems for opportunistic user context recognition. ACM Comput. Surv. 45, 3, Article 27 (Jun. 2013) (Year: 2013).*

(Continued)

*Primary Examiner* — Andrew B Whitaker
(74) *Attorney, Agent, or Firm* — Hunton Andrews Kurth LLP

(57) ABSTRACT

A method for collecting data using a smart device such as a cellphone is disclosed. The method is implemented in connection with a recommendation algorithm. In one step, the method determines the technical feasibility of collecting data for the smart device. The method also facilitates data collection when it is convenient for the user. This method optimizes data collection accuracy and technically enhances the smart device because it optimizes the timing of the data collection.

12 Claims, 4 Drawing Sheets

(56) References Cited

U.S. PATENT DOCUMENTS

| | | | |
|---|---|---|---|
| 2010/0287110 A1* | 11/2010 | Scarborough | G09B 7/02 |
| | | | 705/321 |
| 2011/0276507 A1* | 11/2011 | O'Malley | G06Q 30/00 |
| | | | 705/321 |
| 2012/0197835 A1* | 8/2012 | Costa | G06Q 10/1053 |
| | | | 706/52 |
| 2013/0097093 A1 | 4/2013 | Kolber et al. | |
| 2013/0110636 A1* | 5/2013 | Bott | H04W 4/60 |
| | | | 705/14.64 |
| 2013/0325734 A1* | 12/2013 | Bixler | G06Q 10/1053 |
| | | | 705/321 |
| 2014/0122355 A1 | 5/2014 | Hardtke et al. | |

OTHER PUBLICATIONS

Johnson, J.W. et al.; "Validation is Like Motor Oil: Synthetic is Better", Industrial and Organizational Psychology, 3 (2010), pp. 305-328.

* cited by examiner

| ID | Job Title | Skill 1 | Importance of Skill 1 | Skill 2 | Importance of Skill 2 | Skill 3 | Importance of Skill 3 |
|---|---|---|---|---|---|---|---|
| 1 | Associate | Research | 5 | Writing | 5 | N/A | N/A |
| ... | ... | ... | ... | ... | ... | ... | ... |
| 345 | Associate | Writing | 4 | Reading | 4 | Negotiation | 2 |
| 346 | Partner | Writing | 4 | Research | 4 | Marketing | 4 |
| 347 | Associate | Writing | 5 | Problem solving | 4 | Reading | 4 |
| 348 | Bus. Dev. | Sales | 4 | Marketing | 4 | Negotiation | 4 |
| 349 | Associate | Marketing | 1 | Reading | 3 | N/A | N/A |
| 350 | Accounting | Sales | 2 | Puzzle solving | 3 | Mathematics | 3 |
| ... | ... | ... | ... | ... | ... | ... | ... |
| 871 | Partner | Reading | 5 | Writing | 4 | Marketing | 5 |

*FIG. 1*

METHOD AND SYSTEM FOR DYNAMIC DATA COLLECTION WHILE OPTIMIZE A SMART DEVICE

BACKGROUND

Recent advances in computer technology have made it easier for smart devices to collect information on their users. For example, many social media or email messaging platforms continuously detect and collect data on their users. This type of data gathering is passive because no action is needed on the part of the user to provide the information to the smart device. Passive data collection might not be noticeable to the user.

SUMMARY

Some types of data cannot be collected using passive data collection techniques, and thus, the data has to be collected using active data collection techniques. In active data collection techniques, a participant is asked to provide data to a system or smart device. Despite recent advances in computer technology, active data collection techniques have remained the same. In many cases, a participant has to provide answers to a static set of questions provided on a survey, and most of the times, the participant is not compensated for her time. However, generally, it is inconvenient to participate in a survey. Moreover, typically a participant does not have any stake in the outcome of the survey. This inconvenience coupled with the lack of compensation can make the participant disinterested in answering the survey questions, and as a result, some participants provide inaccurate or incomplete answers. Yet collecting accurate and complete data is important to the purpose of data collection, which is data analysis.

In addition, these days many participants provide survey responses through smart devices such as cellphones. However, many surveys fail to address the needs of these smart devices. For example, some surveys do not have the proper format for optimal display in a smart device. Other surveys prompt the participant when the smart device is inundated with tasks (e.g., during an update), and hence, the process can become even more tedious. Therefore, effective data collection should take into account the processing power of the participant's smart device.

Thus, it is an object of this disclosure to introduce a method, apparatus and system for active data collection using smart devices such as cellphones. The method, apparatus and system of this disclosure can facilitate data collection when it is convenient for the participant and technically feasible for the smart device. Therefore, the method, apparatus and system of this disclosure can optimize data collection accuracy. Moreover, the method, apparatus and system of this disclosure can technically enhance the smart device because they optimize the timing of the data collection.

In this regard, various data collection techniques have been disclosed. These data collection techniques are implemented in connection with a job search or recommendation algorithm. A problem with most job search algorithms is that these algorithms generally operate based on job descriptions provided by job posts. For example, on the employer side, a search algorithm can select candidates whose resumes match the description of a job post and on the candidate side, the algorithm can find job posts which match the candidate's stated experiences in the resume.

One problem with these job search techniques is that job posts do not accurately state the skillsets needed to perform the tasks demanded by the position, and hence, these job search techniques fail to select the most qualified candidates for the position. Sometimes job posts use generic descriptions, but generic descriptions do not correctly identify the skills needed to perform a particular job successfully. Moreover, for certain positions, the job responsibilities can change over time, and thus, a generic description can be outdated and inaccurate. In some instances, these descriptions are not even drafted by someone who has actual work experience in the field. As a result, the descriptions might not accurately reflect the current job responsibilities and company needs. Additionally, even if an actual employee drafts the post about the position, the description can still be insufficient because the employee's view might be subjective. Therefore, traditional job posts and job search methods are deficient because they do not approach job search objectively or empirically. The implementation of the data collection techniques disclosed herein with the job search algorithms discussed below provide for robust techniques which are novel, accurate and efficient, and operate independent of subjective job post descriptions.

Some companies ask job candidates to take qualification tests in order to apply for a job opening. Creating a new qualification test for a company which takes into account all the needs of the job can be expensive, and thus, most companies ask candidates to take general competency tests, e.g., a general test for hiring secretaries. However, these tests are not designed for measuring the skillsets needed for the specific job at the company because general tests fail to recognize that even identical job titles in different companies can require different skillsets and background knowledge. As such, these general competency tests can question candidates about issues that are not related to the needs of the specific job at the company or the tests can neglect to question the candidate about other issues relating to the specific job. These problems can occur when no objective technique has been used to determine the skillsets needed to perform a specific job effectively.

In addition, in some cases it is beneficial to offer secondary job suggestions to job candidates, but without an objective understanding of the skillsets needed for each job, offering secondary job suggestions is not possible. For example, after a candidate takes the general test for a job opening and interviews at the company, the company determines that the candidate can be a good fit for the company. However, ultimately the company decides not to hire the candidate for the opening, e.g., because the candidate is not the best fit for the job. Yet, there can be other job openings at the company which the candidate can be a good fit for. In these circumstances, because the candidate has not taken any other qualification test, the company cannot determine whether the candidate would qualify for another opening at the company, and thus, the company would not be able to make any secondary recommendations to the candidate. Therefore, it is an object of this disclosure to provide for a system, apparatus and method for objectively determining the competencies needed for a particular job. Additionally, it is also an object of this disclosure to evaluate a candidate's qualifications for a job using the candidate's qualification test result for a different job.

A system, apparatus and method have been proposed to address these issues. Specifically, a smart device can determine when an employee is not busy with any job-related tasks. The smart device can also determine whether the smart device's processing power is tied to other tasks. Once a determination is made that the employee is not busy and/or that the smart device can handle a survey, the employee is provided with a set of questions about the employee's job. The employee can answer these questions, and each employee's smart device can transmit the answers to a server. The server can gather the data in a dataset. The server can perform various statistical techniques on the dataset to determine one or more groups of skillsets or competencies needed for performance of each job included in the dataset. For each job in the dataset, each group of skillsets or competencies can be a component of the job, e.g., communication, teamwork or analytical thinking.

The company can create various qualification tests for predicting the components of each job. These tests can evaluate job competencies of the test taker. The smart devices of the employees can offer the qualification tests to the employees of the company (e.g., when the employees are not busy or when there is enough processing power), and the employees can respond to these qualification tests. Moreover, the supervisors of the employees can be asked to provide performance data for the employees. For example, the supervisors can evaluate each employee based on the employees performance on each component of the employee's job (e.g., teamwork, communication, etc.). The server can gather the test data and performance data for the employees who responded to the survey questions. Using this information, the server can determine the predictive quality of each qualification test to predict each individual component. Specifically, using individual validity coefficients for each job component, the test results can be grouped together to determine an overall predictive performance score.

When a candidate applies for a first position at the company, the candidate can be asked to take a qualification test. The qualification test can be the same test as the tests that have been administered to the employees of the company. Based on the candidate's performance on the qualification test, the server can predict a performance score for the employee. In some embodiments, the server can make a secondary recommendation to the candidate. This secondary recommendation can be a second position at the company for which the candidate qualifies. The server can deliver the recommendation based on the components of the second position and the candidate's performance on the qualification test for the first position by examining the relationship between the candidate's test scores and the test's abilities to predict performance on the competencies of the second position. However, the candidate does not need to take a separate qualification test for the second position.

BRIEF DESCRIPTION OF THE DRAWINGS

FIG. 1 shows an example dataset including survey responses for employees of a law firm.

DETAILED DESCRIPTION

Job Survey

Figure 2:
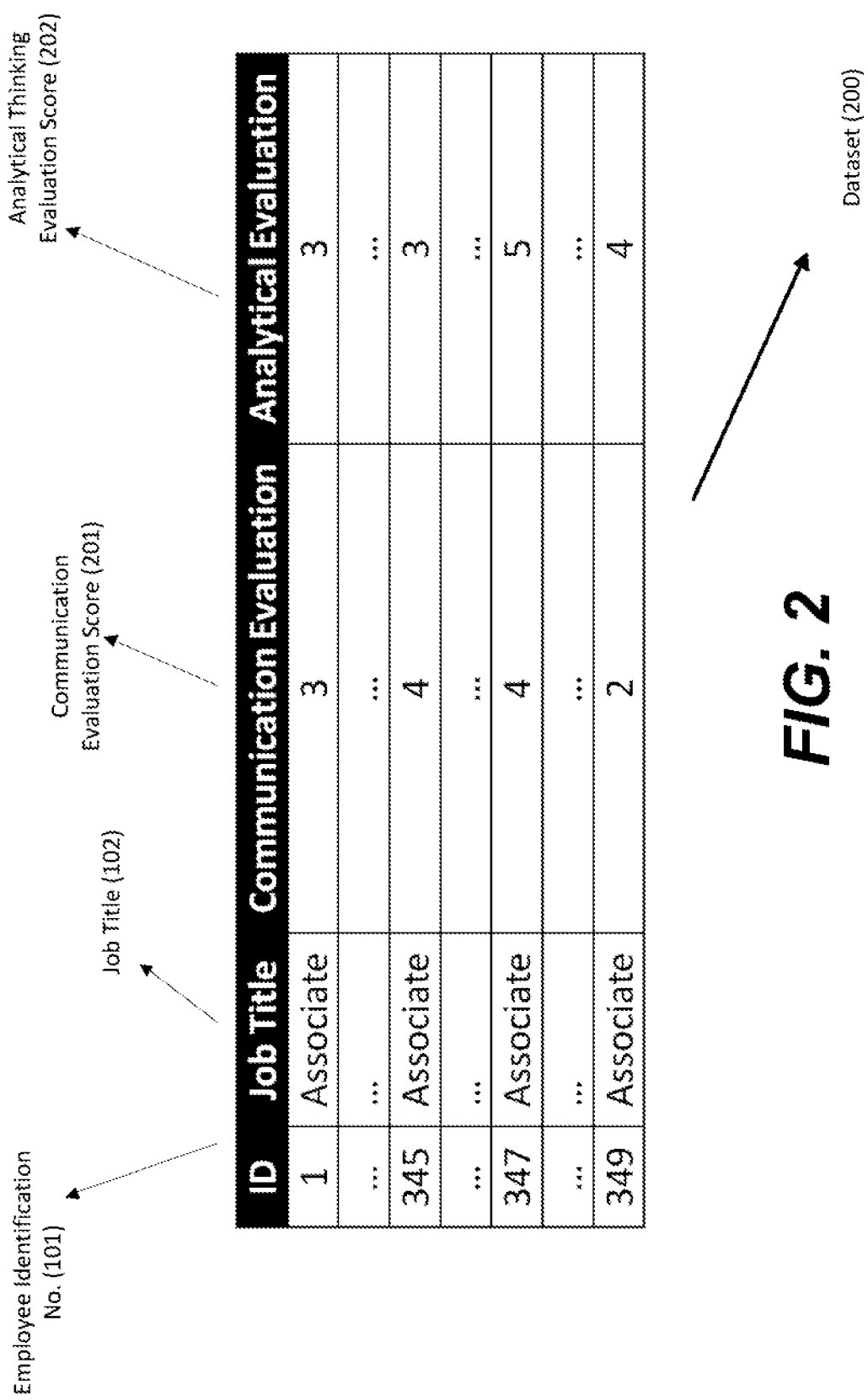
FIG. 2 shows an example dataset including performance data for the employees of a law firm.

In an example embodiment, an employee of a company is provided with a survey. The survey can include questions about the employee's position. For example, the survey can ask the employee to identify any knowledge, skill, competency, ability or work activity ("skillset") required for success in the employee's position. In some embodiments, the survey can ask questions about any skillset required for success in a position that the employee supervises or is otherwise familiar with.

The survey can include various multiple-choice questions. However, the survey can include other types of questions in addition to or instead of multiple-choice questions. For example, the employee can be asked to name various skills required for the employee's job. There can be a question on how often the skills are needed for the job or how important the skills are for success in the job. The employee can be asked whether each skill is need on the first day on the job. The survey can be distributed among multiple employees of the company and the employees' answers can be gathered in a dataset. The employees can hold the same or different job titles (or job codes).

In an example embodiment, the survey can ask the employees of a law firm to identify the skills their respective positions require of them to perform their tasks successfully. For example, some associates responding to the survey can identify, among others, reading, writing, research, teamwork and problem solving as the skills important for an associate position. Similarly, some partners can identify these skills as well as other skills such as marketing and public speaking as important for a partner position. Likewise, some business development staff can identify negotiation, sales and marketing as important skills for their position.

All the responses provided by the employees can be gathered in a dataset for further analysis. The dataset can include a set of entries. Each entry can include an employee identification number, a job title (or job code) for the employee, various skills identified by the employee, and the importance of each skill. The entries can include other information as well, e.g., biographical information about the employee, how long the employee has been working at the position, prior employment, location, etc.

FIG. 1 shows an example dataset 100 including survey responses for employees of a law firm. In this example embodiment, the dataset 100 can include employee identification numbers 101, job title (or job code) 102, skills identified by each employee 103 and the importance of the skills 104. For example, an employee with employee identification number 1 holds an associate position at the law firm. The employee identified research and writing as important skills for success as an associate in the law firm. The employee did not identify any other skills, i.e., skill 3 for employee 1 is N/A. The employee gave an importance score of 5 for research skills and an importance score of 5 for writing skills. Similarly, an associate with employee identification number 345 identified writing, reading and negotiation as important skills for success in his job. The associate gave an importance score of 4 for writing skills, an importance score of 4 for reading skills and an importance score of 2 for negotiation skills.

Although in this example embodiment each employee was asked about the employee's job, in other embodiments, an employee can be asked about another employee's position. For example, in a law firm, a partner can supervise one or more associates or patent agents. The partner can be asked to identify important skills for an associate position or a patent agent position. Because a partner supervises associates and patent agents, the partner's perspective can also be relevant to the model. Hence, the partner's responses can be included in the dataset.

Effective Data Collection for Processor Optimization of the Smart Device

The system, method and apparatus according to this disclosure optimize data collection by prompting the user (employee or participant) at a time when it is convenient for the user to answer survey questions. They also continue asking the questions so long as the questioning does not interrupt the employee's work. In order to effectively collect data from a user, in one embodiment, a user can be prompted with survey questions only when the user is not busy with tasks relating to the user's job. In some embodiments, the questions will continue only for a short period of time as determined by the user's historical activities on the smart device. Furthermore, data collection from a user can be further optimized if the data collection occurs only when the user's smart device is not inundated with other processing intensive tasks. In some embodiments, the smart device decides when to prompt the user to participate in the survey. In other embodiment, a server in communication with the smart device can decide when the user should be prompted. The server can send a signal to the smart device to cause the smart device to prompt the user.

In one example embodiment, the user's smart device can monitor the user's activities on the user's smart device and work calendar. There can be a predefined list of activities that are deemed unrelated to the user's job. For example, playing a game or surfing the web on the user's smart device can be considered unrelated to the user's job. The user's work calendar can further inform this process. For example, if on the user's work calendar there is a work related entry, the smart device can consider the time associated with the user's entry as work time.

The smart device can track a user's unrelated activities and store a log of the activities on the smart device. The smart device can run various statistical analyses on this data and determine a pattern for the user's activities unrelated to the user's job. For example, the smart device can determine when it is more likely for the user to engage in activities unrelated to the user's job and determine an average time for these activities.

In one embodiment, the smart device can prompt the user to answer a survey question when the user engages in an activity unrelated to the user's job, e.g., the user plays a game. In another embodiment, the user can be prompted to answer a survey question when the user is most likely to engage in an activity unrelated to the user's job. Yet in another embodiment, the user can be prompted with survey questions for a period of time not exceeding an average length of time for the user's unrelated activities. Yet in another embodiment, a user cannot be prompted with a survey question if the user has a work related entry on the user's work calendar.

In an example embodiment, a user's historical work habits can be used in determining whether to prompt the user with a question. For example, the smart device can monitor a user's daily activities and determine that the user engages in unrelated activities after lunch. In this example embodiment, the smart device can prompt the user to answer survey questions after lunch.

In yet another example embodiment, the questions of the survey can be divided in several groups, and each group of the questions can be presented to the user at a different time. These groups can be based on item type or content. In some embodiments, a priority score can be associated with each survey question and the user can be presented with higher priority questions before the user is prompted with lower priority questions. For example, questions relating to the components of the component profile of the company which are more likely to be included in a user's job can be given higher priority over other questions. This can be helpful, for example, when a company is seeking to determine whether there has been any change in the component profile of the user's job.

In an example embodiment, a user can be presented with the same or updated survey questions periodically, e.g., once every year. These questions can determine whether the responsibilities of a particular job have changed. For example, it is possible that a company decides to undertake a new business endeavor. As a result, an employee can be asked to undertake new responsibilities. By surveying the employees periodically, the company can keep abreast of the responsibilities of each position. Updated survey questions can also be more specific than the original survey questions. For example, after determining the components of each job (discussed below), the survey questions can focus on the components of the job as opposed to the skills of the job, e.g., instead of asking questions about writing skills and public speaking skills, the survey can focus on communication skills.

In some embodiments, the survey questions can be presented to the users only when the processing demand on the user's smart device is low. In local systems, when a user's smart device is busy with other tasks which require processing power, it can be inconvenient for the user to be prompted with survey questions. This can slow down the user's smart device and interfere with the user's or smart device's activities. With the advent of cloud computing, some companies have migrated their systems to the cloud. However, in some instances, these companies are provided with a limited amount of processing power at any given time. Presenting the users with survey questions when the company's cloud system is close to its processing limit can disrupt the work flow at the company. Therefore, it can be beneficial to avoid prompting the user with survey questions when the user's device has limited processing power.

In an example embodiment, the smart phone of the user can prompt the user with a question prior to displaying the survey questions. For example, the smart device can display a message indicating that the survey questions take 15 minutes to complete, and ask the user if the user wants to participate in the survey. If the user agrees to participate, the smart phone can display the survey questions.

There can be several techniques for optimizing the timing of the survey questions to avoid interference with a smart device's activities, thereby optimizing the performance of the smart device. In one example embodiment, a smart device can create a log of the smart device's processing activities. Based on the log, the smart device can determine historical demand on the smart device's processor. For example, the smart device can determine when low processing demand is expected. In this example embodiment, the user is prompted with a survey question only if low demand is expected of the smart device's processor. In an example embodiment, a user is prompted with survey questions only if the current processing demand of the user's device is below a threshold value. In another example embodiment, an average processing demand of the user's device is determined and if the current processing demand is less than the average amount, the user can be prompted with a survey question.

In some embodiments, the user can be prompted with an option to answer the survey questions at a later time. If the user chooses this option, the questioning can be stopped and the user can be asked to answer questions at a later time. In some embodiments, in addition to postponing the questioning, the user can schedule the survey for a specified later time. The smart device can prompt the user at the specified time.

In an example embodiment, the survey can be printed and distributed among the employees of the company. In another example embodiment, the survey can be distributed electronically, e.g., PDF document.

In the above disclosure, in some embodiments, the smart device was described as the device that determines when to prompt the user to participate in a survey. One of ordinary skill in the art recognizes that some of the steps discussed above can be performed by the server, and the server can notify the smart device about the results of these steps. For example, the server can receive data sufficient for the server to determine when to prompt the user. The server can analyze the data and send a signal to the smart device to cause the smart device to prompt a notification to the user.

Component Profile of a Job

In an example embodiment, an analysis can be performed to determine a profile of different components important for each job included in the dataset. Each component can be a container of one or more work activities, behaviors, competencies, areas of knowledge, skills or abilities that require similar underlying characteristics. In order to determine a component profile for a job, as a first step, one can determine a components model for the company (or a segment of the enterprise). The components model of the company is the result of an analysis of all the survey responses provided by the employees of the company (or the segment of the company). This analysis classifies the responses into several groups, each group being a component. For example, this analysis can classify all the communication related elements or survey responses (e.g., reading, writing, public speaking) as a communication component. The components model can identify all the possible components for most or all the jobs in the company (or the segment of the enterprise).

As a second step, one can determine the component profile for each job. This determination can be made by analyzing the survey responses provided by a representative sample (or all) the employees holding a given job. Specifically, if certain number of the employees holding a job identify elements of a particular component as important for their job, one can determine that this particular component is a component of that job. For example, if most associates in a law firm identify communication related elements as important for success in their jobs, one can determine that communication is a component of an associate position. Additionally, if most associates in the firm indicate that tasks and skills related to negotiation are not important to success in their role, then the negotiation component would not be included in the component profile for the associate position.

In other words, performing the analysis of the first step (e.g., principal component analysis) enables one to determine how survey elements cluster into job components. For example, in the first step, one can find (using, e.g., Principal Components Analysis) that questions relating to reading, writing and public speaking map to the communication component. In the second step, one evaluates the responses of all the employees for each job title (or job code). If the average responses to these elements of the communication component for employees of a specific job title is higher than a threshold number, then one can determine that the communication component is important for that job title. In some embodiments, after performing the first and second steps, one can review the component profile (with, e.g., Structural Equation Modeling) to ensure it makes logical sense.

Various exemplary techniques can be used to determine a components model for a company. Factor analysis, principal component analysis, exploratory factor analysis, structural equation modeling (SEM) and Angoff method are a few examples of these exemplary techniques.

Factor analysis is a statistical method used to describe variability among observed, correlated variables in terms of a potentially lower number of unobserved variables called factors. For example, it is possible that variations in six observed variables mainly reflect the variations in two unobserved (underlying) variables. Factor analysis searches for such joint variations in response to unobserved latent variables. The observed variables are modelled as linear combinations of the potential factors, plus error terms. Factor analysis aims to find independent latent variables.

Principal component analysis (PCA) is a statistical procedure that uses an orthogonal transformation to convert a set of observations of possibly correlated variables into a set of values of linearly uncorrelated variables called principal components. This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors are an uncorrelated orthogonal basis set. PCA is sensitive to the relative scaling of the original variables.

Exploratory factor analysis (EFA) is a statistical method used to uncover the underlying structure of a relatively large set of variables. EFA can be based on the common factor model. In this model, manifest variables are expressed as a function of common factors, unique factors, and errors of measurement. Each unique factor influences only one manifest variable, and does not explain correlations between manifest variables. Common factors influence more than one manifest variable and factor loadings are measures of the influence of a common factor on a manifest variable. For the EFA procedure, one can identify the common factors and the related manifest variables. EFA procedures can be more accurate when each factor is represented by multiple measured variables in the analysis.

By performing any of the above-named techniques on the dataset, one can identify the components model for the company. For example, for the law firm in FIG. 1, performance of the principal component analysis on the dataset 100 can identify all the components for the jobs at the law firm. These components can include analytical thinking (which can include skills or elements such as research and problem solving), communication (which can include skills or elements such as reading, writing and public speaking), negotiation, marketing, business development, etc.

By evaluating the associate responses in the law firm of FIG. 1, one can determine that an associate position can have components such as communication and analytical thinking. This is because many of the associates who responded to the survey identified reading, writing, research and problem solving as skills important for an associate position. According to the component profile of the law firm, reading and writing belong to the communication component and research and problem solving belong to the analytical thinking component.

By evaluating the partner responses, one can determine the components of this job to include communication (e.g., reading, writing and public speaking), analytical thinking (e.g., research and problem solving) and marketing. By evaluating the patent agent responses, one can determine the components of this job to include quantitative analysis (e.g., mathematics and sciences) and communication.

By performing the above described analysis, one can determine which groups of skills (or components) are important for each position listed in the dataset, as determined by the employees of the company. Because the data is provided by the employees of the company, it can be an accurate reflection of the company's current needs and demands. Additionally, using this analysis, one can determine which skills or groups of skills are irrelevant or less important to each job listed in the dataset. For example, one can determine that a quantitative analysis skillset is not important for an associate or partner position. It is particularly advantageous to objectively determine what skillsets (or components) are important for a position and what skillsets (or components) are not as important.

Refining the Survey Questions

One of the benefits of determining the components model for the company and the component profile of each job is that one can determine which survey elements relate to the same job components. Additionally, one can determine which survey elements do not contribute to any of the job components. After conducting an initial survey in a company and determining all the potential job components, the company can conduct follow-up surveys to stay informed of any changes in the components model for the company or the component profile of each job in the company.

In one embodiment, a follow-up survey can exclude some of the survey elements that contribute to the same component or do not contribute to any component. For example, if a survey includes several questions about analytical thinking, one can remove at least some of the questions and still obtain the same results from the survey because some analytical thinking elements tend to provide the same information. As another example, if a survey includes a question about physical strength and no job at the company has a component directed to physical strength (or no component of the company components model includes this element), one can remove the questions relating to physical strength from the survey. As yet another example, if a survey includes a question about physical strength and an associate position does not have a component directed to physical strength (and is unlikely to have such a component in future), one can remove the questions relating to physical strength from the survey. Using this technique, the survey can become more efficient over time, and thus, one can respond to the survey faster.

Performance Data

In an example embodiment, performance data can be gathered for the employees of the company. These employees can be a representative sample of the employees of the company, the employees who participated in the survey, or all the employees of the company. Specifically, after determining the components of each job, an employee's supervisor can be asked to provide performance data for the employee. The performance data can pertain to the employee's performance relating to each component of the employee's job.

FIG. 2 shows an example dataset 200 including performance data for associates of a law firm. In this example embodiment, the dataset 200 can include employee identification numbers 101, job title (or job code) 102, communication evaluation score 201 and analytical thinking evaluation score 202. The evaluation scores 201 and 202 can indicate how well each associate performs the associate's responsibilities relating to each component of the associate's job, e.g., communication and analytical thinking. In one embodiment, the associate's supervisor can provide performance scores for the associate. In another embodiment, several supervisors and/or colleagues of the associate can provide performance scores for the associate. In yet another embodiment, the associate can provide a self-evaluation scores.

Development of the Qualification Test for Each Job

Many tests have been proposed for predicting a candidate's performance on a job. However, every company has its own specific needs and requirements for a job, and as a result, two jobs with the same title at two different companies might require different responsibilities from the employees. Moreover, measuring the relationship between a general test and overall performance of an employee at a specific job is not an easy task. However, it is easier to measure the relationship between a specific test and components of a job.

In an example embodiment, the employees of a company can be asked to take a qualification test (including a plurality of subtests). Each qualification test or subtest can evaluate an employee's skillsets relating to one or more components of the employee's job. For example, one subtest can measure cognitive abilities related to the communication and analytical thinking components, and another subtest can measure organizational fit and work style preferences related to the teamwork component. Qualification tests can be administered to some or all of the employees of the company. The employees who take the qualification tests can be the employees who have received performance data for their jobs. In one embodiment, the employees who take the qualification tests must be the employees who have received performance data for their jobs.

For example, as discussed above, the component profile of an associate position can include analytical thinking, communication, teamwork and organizational fit. Therefore, it is desirable to hire a candidate who has strong analytical thinking, communication and teamwork skills, who fits well in the organization. In this regard, the law firm can develop and administer a test including two subtests. The first subtest can measure the associate's communication and analytical thinking skills. The second subtest can measure the associate's teamwork skills and organizational fit. Similarly, for a partner position, in addition to these skills, marketing skills can also be important. Therefore, the test administered for the partners can include three subtests. The additional subtest can measure the partner's marketing skills. As demonstrated by this example, there can be an overlap between the subject matter of the partner test and associate test in that both tests can measure a candidates analytical, communication and teamwork skills and organizational fit.

Because component performance data is provided for employees who take the tests, the company can measure how accurately each qualification test predicts performance in each job because the company can determine a relationship between the score on a subtest (of the qualification test) and the performance for that component of the employee's job. Specifically, the company can compute a validity coefficient between a subtest and performance in a component of a job. This indicates the strength of the predictive relationship between the subtest result and performance on that job component. Based on the specific component profile for a job, the company can statistically combine the individual validity coefficients for the relevant job components and calculate an overall predictive performance score for that collection of tests or subtests. This method is known as synthetic validity. It is a logical process of inferring validity on the basis of the relationships between components of a job and tests of the attributes that are needed to perform those components. It synthesizes an overall validity coefficient for that job based on only the components that are important for that job. Scoring algorithms can be devised to optimize overall predictive power and other outcomes. For a given candidate, if the overall predictive performance score exceeds a threshold number, the candidate can be advanced to the next stage of the application process. In one embodiment, test scores can be used to assign candidates to a band or range (e.g., high, medium, low) indicating the level of qualification, which can determine whether the candidate can advance to the next stage.

In an example embodiment, the individual scores for each subtest score can be translated into standardized scores, e.g., z-scores. Translating the scores into standardized scores can facilitate comparison and combination of the test scores on a standardized scale. For example, for a given candidate applying for a position, after calculating the z-scores of the subtests of the candidate, the optimized scoring algorithm can calculate an overall predictive test score. If this score is higher than a predetermined cutoff score for the job, the candidate passes the initial screening stage.

Figure 3:
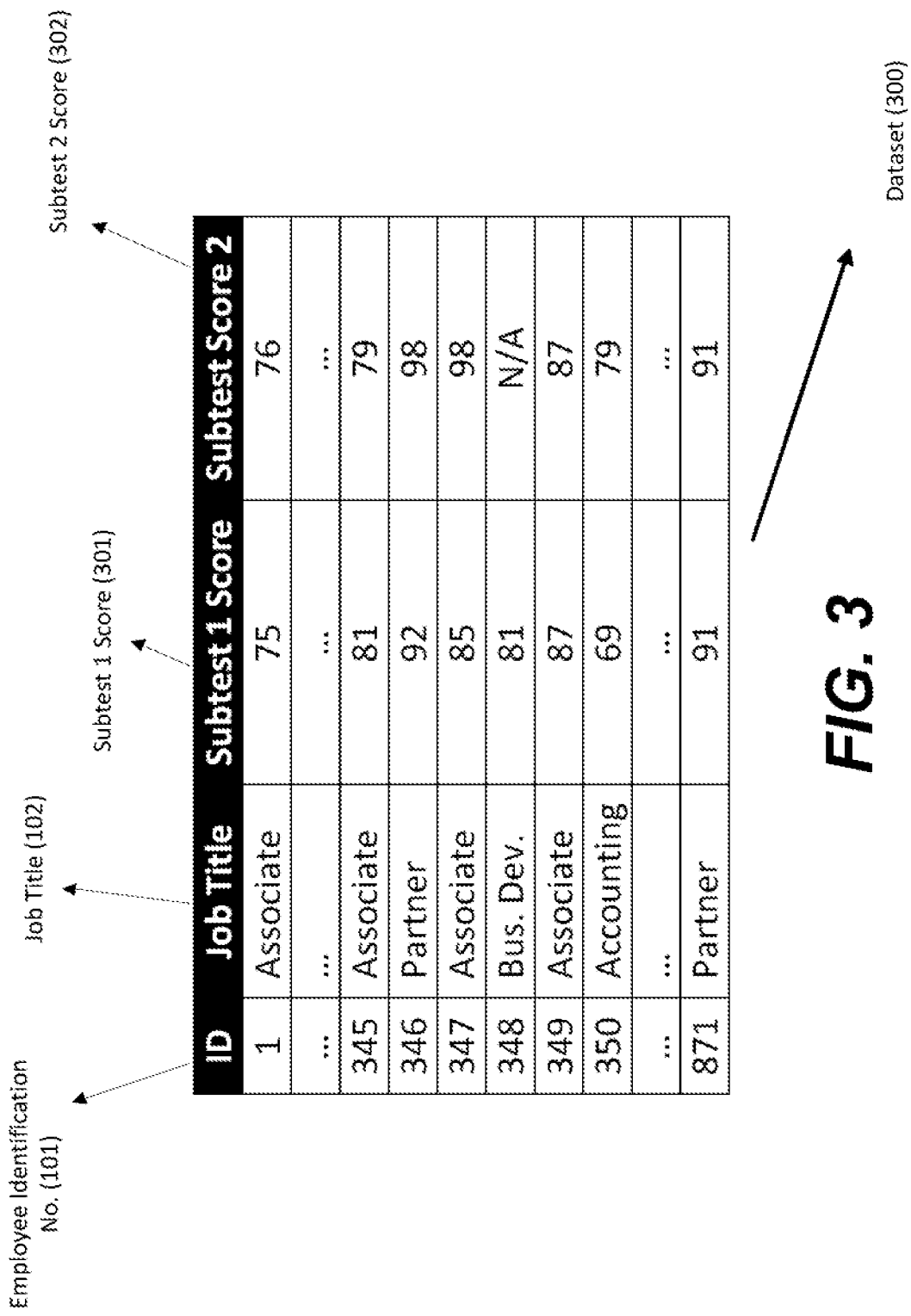
FIG. 3 shows an example dataset including test data for the employees of a law firm.

FIG. 3 shows an example dataset 300 including test data for the employees of a law firm. In this example embodiment, the qualification test can include two subtests, each subtest measuring the employee's skills or ability relating to one or more components of the employee's job. The subtests can be different for employees with different job titles. The dataset 300 can include employee identification numbers 101 and job title (or job code) 102. The dataset 300 can also include subtest scores 301 and 302 for each employee who took the qualification test(s).

Candidate Defined Criteria and Qualification Test

In an example embodiment, a candidate applies for a job. The candidate can specify a set of threshold conditions in the application. For example, the candidate can specify a preferred geographical location, a required minimum salary, a desired maximum number of work hours, etc.

As part of the application process, the candidate can take a qualification test for the job. The job can include a component profile including one or more components (each component being a container of skills, abilities, or knowledge areas). In some embodiments, the qualification test can include several subtests, each subtest targeting at least one component of the job. The candidate can receive a score for the qualification test or a plurality of scores for the subtests of the qualification test. Based on the candidate's performance on each subtest and/or the overall performance on the qualification test, a predictive test score can be calculated for the candidate for the job. If the candidate receives a predictive test score that exceeds a predefined threshold value, the application can advance to the next step of the application process.

In some embodiments, despite a candidate applying for a specific job, there can be benefits in considering the candidate for other positions within the company. For example, a candidate can fail the application process for a variety of reasons unrelated to the candidate's qualifications, e.g., when an unusually strong pool of candidates applies for a position all at the same time. During the application process, the candidate learns a great deal about the company, its mission and organizational purpose and the company invests time and resources in assessing and otherwise vetting the candidate. Therefore, there can be benefits in considering the candidate for other openings at the same company, particularly if the candidate receives positive feedback during the interviews.

For example, an attorney applies to a law firm for a partner position. At this firm, based on various surveys conducted and synthesized by techniques such as principal component analysis, a component profile has been created for some of the positions at the law firm, e.g., for a partner position, components such as communication, analytical thinking and marketing have been noted and for an associate position, components such as communication, analytical thinking and attention to details have been observed. The law firm asks the attorney to take a qualification test for the partner position opening. This test includes several subtests for evaluating communication, analytical thinking and marketing skillsets. The attorney performs well on the qualification test and receives a high enough predictive score, e.g., the attorney achieves a test score higher than a threshold value. However, the attorney ultimately does not receive an offer from the firm because of, e.g., financial reasons. Yet, the attorney leaves a very strong overall impression on the firm and the firm decides to consider the attorney for other positions in the law firm. Hence, the system and apparatus of this disclosure can make a recommendation to the law firm or the attorney based on the attorney's performance on the qualification test.

Secondary Job Recommendation

In an example embodiment, a candidate can apply for a job opening and takes a qualification test for the job. A server of the employer can receive the candidate's information in connection with the job (i.e., the first job). The server can make a secondary recommendation to the candidate. For example, the secondary recommendation can be made if the candidate for some reason is not chosen or hired for the first job. As another example, the secondary recommendation can be made if the candidate better qualifies for a second job opening than the first job opening. The secondary recommendation can be made in other circumstances as well.

The secondary recommendation can be made without asking the candidate to take an additional qualification test for the second job. In some embodiments, the secondary recommendation is based, in part, on the candidate's defined threshold conditions. For example, the secondary recommendation can be made to the candidate only if another job opening is available to the candidate within the candidate's defined geographical area of interest. As another example, the secondary recommendation can be made to the candidate only when another job opening meeting the candidate's stated salary is available.

In some embodiments, the secondary recommendation can be made even if the candidate's stated threshold condition is not met by the job opening. For example, the secondary recommendation would be made even if the candidate's stated salary is not exactly the same as the opening's offered salary. Nonetheless, if the posted salary is within a tolerance range of the stated salary, e.g., 5%, the secondary recommendation can still be made to the candidate.

In some embodiments, the process for making the secondary recommendation can include one or more of the following steps. First, for the test that the candidate took, one determines if there is another job with a similar set of components. This can determine if there are other jobs for which the candidate's test score can make predictions. Subsequently, using the candidate's score on the test, a new predictive test score can be calculated. If the score is higher than a standardized cutoff value, the candidate can be qualified for a secondary job recommendation.

The individual validity coefficients established between each test and each component were determined during the test development and validation stage. So, at this point, the relationships between each test and each component are known. For the secondary job, one can take the validity coefficients that exist between each test the candidate took and each component of that second job and combine them to arrive at the predictive test score.

In one embodiment, the server can determine the components of the first job for which the candidate has applied. The server can look for other job openings that have some or all of the same components as the first job. For each second job meeting this condition, the server can determine which components of the second job overlap with those of the first job. For the overlapping components, the server can determine the candidate's subtest scores and the validity coefficients. Based on the subtest scores and validity coefficients, the server can determine a predictive performance score for the candidate for the second job. If this score exceeds a threshold value defined for the second job, the server can recommend the second job to the company or candidate. In one embodiment, the overlapping components can be determined by determining which components are predicted well by the tests that the candidate has already taken and then look for jobs with these components.

In an example embodiment, an attorney applies for a partner position at a law firm. After taking a qualification test and interviewing with the firm, the firm decides against hiring the attorney as a partner. In this firm, the component profile for a partner position is very similar to the component profile for an associate position. Specifically, the component profile of the partner position includes components such as communication, analytical thinking and marketing, and the component profile of the associate position includes components such as communication, analytical thinking and attention to details. Therefore, the components of the partner position can overlap with the components of the associate position because they both include communication and analytical thinking. Given the outstanding performance of the attorney during the interviews, the firm (or the server) can decide to offer a secondary recommendation to the partner. In this case, the system disclosed herein, based on the qualification test score of the attorney for the partner position and the validity coefficient for the associate position, can determine a predictive performance score for the associate position. If the predictive performance score for the candidate is higher than a threshold value, then the system can make a recommendation to consider the attorney for the associate position.

In this embodiment, the system can push a message to the candidate, e.g., "Based on your assessment results, you may be a good match for these open positions." The candidate can click on each job opening listed to view a job description. There can by an "apply now" button for each job description, and by pressing the button, the candidate can automatically bypass the testing step for the application process and move to the next stage.

Technical Implementation of the Server

Figure 4:
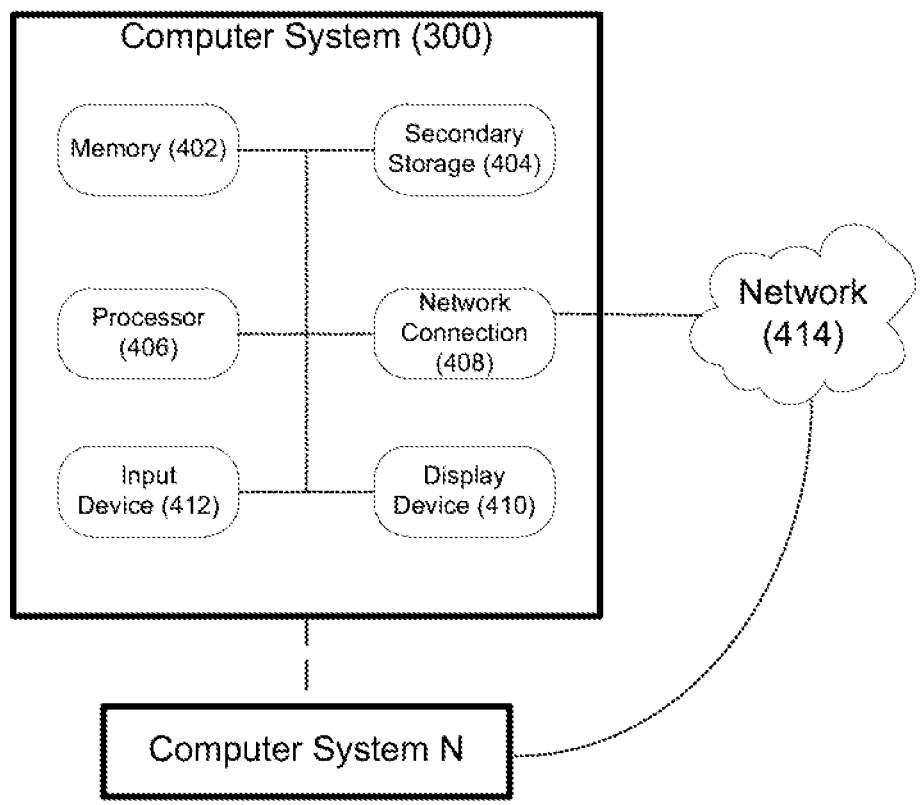
FIG. 4 illustrates exemplary hardware components for a server.

FIG. 4 illustrates exemplary hardware components of a server. A computer system 400, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 400, may run an application (or software) and perform the steps and functionalities described above. Computer system 400 may connect to a network 414, e.g., Internet, or other network, to receive inquires, obtain data, and transmit information and incentives as described above.

The computer system 400 typically includes a memory 402, a secondary storage device 404, and a processor 406. The computer system 400 may also include a plurality of processors 406 and be configured as a plurality of, e.g., bladed servers, or other known server configurations. The computer system 400 may also include a network connection device 408, a display device 410, and an input device 412.

The memory 402 may include RAM or similar types of memory, and it may store one or more applications for execution by processor 406. Secondary storage device 404 may include a hard disk drive, floppy disk drive, CD-ROM drive, or other types of non-volatile data storage. Processor 406 executes the application(s), such as those described herein, which are stored in memory 402 or secondary storage 404, or received from the Internet or other network 414. The processing by processor 406 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 400 may store one or more database structures in the secondary storage 404, for example, for storing and maintaining the information necessary to perform the above-described functions. Alternatively, such information may be in storage devices separate from these components.

Also, as noted, processor 406 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 400.

The input device 412 may include any device for entering information into the computer system 400, such as a touch-screen, keyboard, mouse, cursor-control device, microphone, digital camera, video recorder or camcorder. The input and output device 412 may be used to enter information into GUIs during performance of the methods described above. The display device 410 may include any type of device for presenting visual information such as, for example, a computer monitor or flat-screen display (or mobile device screen). The display device 410 may display the GUIs and/or output from sub-system components (or software).

Examples of the computer system 400 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 400 is shown in detail, system 400 may use multiple computer systems or servers as necessary or desired to support the users and may also use back-up or redundant servers to prevent network downtime in the event of a failure of a particular server. In addition, although computer system 400 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 400, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A server comprising:
a processor, a transmitter and a database, wherein the processor is configured to:
receive, by the transmitter, a processing demand, a log of processing demand, and a log of calendar entries including entries related to work activities and entries unrelated to work activities from a smart device;
calculate an average processing demand of the smart device based on the log of processing demand;
estimate an expected processing demand of the smart device based on the processing demand and the log of calendar entries;
transmit, by the transmitter, a signal to the smart device only when the expected processing demand of the smart device is below the average processing demand and there is no entry related to work activities in the log of calendar entries, wherein the signal includes instructions for the smart device to display a notification in a user interface of the smart device;
receive a first input from the smart device, the first input indicating a rescheduled time for the server to transmit a second signal to the smart device, wherein:
the second signal includes instructions for the smart device to display a second notification in the user interface of the smart device;
the second notification includes a first set of questions including a high priority score and second set of questions including a lower priority score; and
the instructions are configured to cause the smart device to display the first set of questions before the second set of questions;
transmit the second signal to the smart device at the rescheduled time; and
receive a second input from the smart device.

2. The server of claim 1, wherein the second input is a survey response.

3. The server of claim 2, wherein the processor is further configured to:
store the survey response in the database;
determine a component profile for a first job and a component profile for a second job;
receive a qualification test score for a candidate; and
determine whether a candidate qualifies for the first job based on the qualification test score.

4. The server of claim 3, wherein the component profile of the first job is determined by:
determining a components model for a plurality of jobs based on a plurality of survey responses received from a plurality of smart devices, wherein the components model defines a plurality of components;
receiving a plurality of survey responses from a first group of employees of the first job; and
determining the component profile of the first job based on the plurality of survey responses from the first group of employees of the first job.

5. The server of claim 4, wherein the components profile is determined using at least one of a factor analysis, a principal component analysis, an exploratory factor analysis, a structural equation modeling and an Angoff method.

6. The server of claim 4, wherein the processor is further configured to receive performance data from a second group of employees of the first job, wherein the performance data relates to the component profile of the first job.

7. The server of claim 6, wherein the processor is further configured to receive qualification test score for each employee of the second group of employees of the first job.

8. The server of claim 7, wherein the processor is further configured to calculate a validity coefficient for the first job using the performance data and qualification test score of each employee of the second group of employees of the first job.

9. The server of claim 8, wherein the processor is further configured to determine whether the candidate qualifies for the first job based on the qualification test score by using the validity coefficient for the first job.

10. The server of claim 4, wherein the processor is further configured to determine if the candidate qualifies for the second job based on the qualification test score.

11. The server of claim 10, wherein:
the qualification test score is based on a qualification test relating to a second plurality of components; and
the component profile of the second job includes at least one component which is the same as one of the components of the second plurality of components.

12. The server of claim 11, wherein the determination of the candidate's qualification for the second job is based on a validity coefficient and a part of the qualification test score relating to the component shared between the component profile of the second job and the second plurality of components.

* * * * *